United States Patent
Chertkov et al.

(10) Patent No.: US 6,701,050 B1
(45) Date of Patent: Mar. 2, 2004

(54) METHODS AND OPTICAL FIBERS THAT DECREASE PULSE DEGRADATION RESULTING FROM RANDOM CHROMATIC DISPERSION

(75) Inventors: Michael Chertkov, Los Alamos, NM (US); Ildar Gabitov, Los Alamos, NM (US)

(73) Assignee: The Regents of the University of California, Oakland, CA (US)

( * ) Notice: Subject to any disclaimer, the term of this patent is extended or adjusted under 35 U.S.C. 154(b) by 146 days.

(21) Appl. No.: 09/974,717

(22) Filed: Oct. 10, 2001

(51) Int. Cl.[7] .................................................. G02B 6/16
(52) U.S. Cl. ........................ 385/123; 385/124; 398/87
(58) Field of Search ................................. 385/123, 124; 398/87

(56) References Cited

U.S. PATENT DOCUMENTS

| | | | |
|---|---|---|---|
| 5,887,093 A | 3/1999 | Hansen et al. | 385/27 |
| 6,067,149 A | 5/2000 | Gripp et al. | 356/73.1 |
| 6,275,315 B1 * | 8/2001 | Park et al. | 359/153 |
| 6,433,923 B2 * | 8/2002 | Tanaka et al. | 359/337 |
| 6,487,352 B1 * | 11/2002 | Sobiski et al. | 385/122 |

OTHER PUBLICATIONS

Chertkov, et al., Pinning method of Pulse Confinement in Optical Fiber with Random Dispersion, Aug. 8, 2001, 16 pages.

Gramley, Kial, "Optical Fibers: The Future of Bandwidth," webpage, Oct. 17, 2000, 9 pages.

"Dispersion," Optical Communication Systems, Aston University, 2000–2001.

Nagasawa, Yutaka, "High Performance Dispersion Compensating Fiber Module," Fujikura Technical Review, 2001, 7 pages.

"Soliton–Based Optic Fiber Systems," webpage, 8 pages, Aug. 8, 2001.

"Solitons in Fiber and Photonic Optics," webpage, 1 page, Aug. 8, 2001.

* cited by examiner

Primary Examiner—Hemang Sanghavi
Assistant Examiner—Eric Wong
(74) Attorney, Agent, or Firm—Madson & Metcalf

(57) ABSTRACT

The present invention provides methods and optical fibers for periodically pinning an actual (random) accumulated chromatic dispersion of an optical fiber to a predicted accumulated dispersion of the fiber through relatively simple modifications of fiber-optic manufacturing methods or retrofitting of existing fibers. If the pinning occurs with sufficient frequency (at a distance less than or are equal to a correlation scale), pulse degradation resulting from random chromatic dispersion is minimized. Alternatively, pinning may occur quasi-periodically, i.e., the pinning distance is distributed between approximately zero and approximately two to three times the correlation scale.

64 Claims, 9 Drawing Sheets

METHODS AND OPTICAL FIBERS THAT DECREASE PULSE DEGRADATION RESULTING FROM RANDOM CHROMATIC DISPERSION

GOVERNMENT RIGHTS

This invention was made with Government support Contract Number W-7405-ENG-36 awarded by the United States Department of Energy to the Regents of the University of California. The Government has certain rights in the invention.

BACKGROUND OF THE INVENTION

1. The Field of the Invention

The present invention relates to methods of improving transmissions in optical fibers and, more particularly, to methods and apparatuses for decreasing pulse degradation and bit sequence deterioration resulting from random chromatic dispersion in optical fibers.

2. The Relevant Technology

Optical fiber communication systems, especially high-bit rate communication systems, are under active development worldwide. Numerous techniques and apparatuses are being reported for achieving high-bit rates for local area, metropolitan, and long haul optical communications. However, in transmitting information through the optical fibers at high-bit rates the optical signal degrades due to effects of chromatic dispersion (phase change of the optical signal induced by chromatic dispersion) and fiber Kerr nonlinearity (self phase modulation induced by Kerr nonlinearity).

Stable optical solitons result from exact compensation of self phase modulation and phase change due to chromatic dispersion. Soliton pulse propagation has been proposed as a method for transmitting of the information bits in optical fiber telecommunication systems in the presence of chromatic dispersion and Kerr nonlinearity. For example, U.S. Pat. No. 5,558,921, which is hereby incorporated by this reference, discloses a soliton-based single frequency optical fiber communication system with uniformly distributed fiber chromatic dispersion. Further enhancement of soliton-based optical fiber systems by implementing of multi-frequency channel technique (wavelength division multiplexing—WDM), however, is limited due to severe nonlinear inter-channel interaction.

U.S. Pat. No. 6,011,638, which is hereby incorporated by this reference, discloses a method that can effectively eliminate inter-channel interaction in soliton based telecommunication systems with lumped in-line optical amplifiers through proper dispersion management. In one embodiment of this method, the fiber chromatic dispersion decreases exponentially along a fiber as the energy of optical signal decreases. In another embodiment of this method, the exponentially decreasing profile is approximated in a step-wise manner using fiber spans with different values of chromatic dispersion uniformly distributed over each span.

A method for significantly improving the performance of optical communication system was proposed in the paper "Optical-pulse equalization of low-dispersion transmission in single-mode fibers in the 1.3–1.7-µm spectral region" by C. Lin, H. Kogelnik and L. G. Cohen, Opt. Lett. 5, 476 (1980). This method reduces signal deterioration due to chromatic dispersion by means of periodical inserting additional fiber spans with the opposite sign of the dispersion (dispersion management) that are required to keep the overall dispersion within one period close to zero. U.S. Pat. No. 5,471,333, which is hereby incorporated by this reference, discloses a method that eliminates pulse deterioration due to Kerr self-phase modulation by using the effects of the chromatic dispersion within one period of the dispersion map and provides stable oscillating pulses (dispersion managed solitons) was disclosed by. Dispersion managed solitons are stable, compatible with the WDM technique, and well suited for high bit rate telecommunications. Consequently, dispersion managed solitons have been proposed as a method for transmitting the information bits in optical fiber telecommunication systems with dispersion management. For example, U.S. Pat. No. 6,243,181, which is incorporated by this reference, discloses a method of reducing the inter-channel interaction in the soliton based optical communication systems with dispersion management.

The value of chromatic dispersion in the fiber spans of soliton based telecommunication systems is considered to be deterministic (predictable). However, the dispersion is known to randomly vary along the fiber, for example, in dispersion shifted fibers. Random variation of the zero dispersion wavelength was indicated in "Four-wave mixing in an optical fiber in the zero-dispersion wavelength region" by K. Inoue, J. Lightwave Technol. 10, pp. 1553–1561 (1992). Variation of the zero dispersion point was obtained by cutting a 10 km length of dispersion shifted fiber into four 2.5 km segments and subsequent measurement of the average zero dispersion wavelength. The randomness of fiber chromatic dispersion was demonstrated using a nondestructive accurate method of dispersion measurement along a fiber, which method has been disclosed in U.S. Pat. No. 5,956,131, which is hereby incorporated by this reference.

Historically unrecognized effects of random chromatic dispersion have the potential for uncontrolled growth of additional pulse deterioration due to the presence of randomness in fiber chromatic dispersion. Such uncontrolled growth of the pulse deterioration imposes penalties in the transmission system by two different mechanisms. The first mechanism is optical pulse broadening that eventually deteriorates information bit pattern. The second mechanism is shedding of nonlocal continuous radiation from localized optical pulses. Since this continuous radiation is nonlocal, optical pulses experience interaction through continuous radiation, resulting in increased separation between pulses. These penalties rapidly increase with shortening of the pulse width, i.e., when the bit-rate is increased.

Refining fiber optic production technology is expensive and currently does not offer an absolute cure to the adverse effects of random chromatic dispersion. Given the ever-increasing demand for higher transmission rates, minimizing pulse degradation in optical fibers resulting from random chromatic dispersion is important to increasing the bandwidth of optical fiber.

Accordingly, a need exists for methods and optical fibers for decreasing pulse degradation resulting from random chromatic dispersion in optical fibers. It would be a further advancement in the state of the art fiber optics technology to provide such a method and apparatus in a cost-effective manner. It would also be an advancement in the art to provide a method of minimizing pulse degradation resulting from random chromatic dispersion in the existing and newly manufactured cables.

BRIEF SUMMARY OF THE INVENTION

The present invention provides methods and apparatuses for decreasing pulse degradation resulting from random chromatic dispersion in optical fibers. More specifically, the present invention provides methods for periodically pinning (approximating) an actual (random) accumulated chromatic dispersion to a predicted (nominal) accumulated dispersion through relatively simple modifications of fiber-optic manufacturing methods or retrofitting of existing fibers. Through use of these methods and apparatuses, increased optical transmission speeds may be enabled.

If the pinning occurs with sufficient frequency (at a distance less than or equal to a correlation scale, $Z_\xi$), pulse degradation resulting from random chromatic dispersion is minimized. The correlation scale may be defined by the following equation:

$$Z_\xi \sim \tau^4/D,$$

where $\tau$ is a pulse (bit of information) width at which signal is launched into an optical fiber and D indicates dispersion noise strength. Dispersion noise strength is a measure of the variation of actual (random) dispersion relative to predicted (nominal) dispersion.

Pinning may occur periodically (less than or equal to the correlation scale) or quasi-periodically along the length of the optical fiber. Quasi-periodic pinning may involve pinning at irregular intervals. For example, with quasi-periodic pinning, a distance between each consecutive instance of pinning may be between approximately zero and approximately two to three times the correlation scale. In another embodiment, such a distance may be between one half of the correlation scale and one and one half times the correlation scale.

Pinning involves points ("pinning points") along an optical fiber where actual accumulated dispersion approximates (is equal to or nearly equal to) predicted accumulated dispersion. Pinning may involve naturally occurring pinning points or pinning points resulting from the use of compensating strands of optical fiber. A compensating strand of optical fiber may be used to alter actual accumulated dispersion such that it approximates predicted accumulated dispersion.

In one embodiment, which implements naturally occurring pinning points, a predicted accumulated dispersion may be determined from a first point along a first optical fiber. Then, the actual accumulated dispersion from the first point along the first optical fiber may be determined.

Thereafter, a pinning point, where the actual accumulated dispersion approximates the predicted accumulated dispersion, may be located. Next, an optical fiber segment spanning from the first point to the pinning point may be formed.

In one implementation, a plurality of optical fiber segments may be formed, as described above. The plurality of optical fiber segments may be joined to form a second optical fiber using any suitable method.

As explained above, a length of each optical fiber segment may approximate or be less than the correlation scale. Alternatively, the length of each optical fiber segment may be distributed between approximately zero and approximately two to three times the correlation scale (quasi-periodic).

The second optical fiber minimizes pulse degradation resulting from random chromatic dispersion. In fact, if the pinning period is short enough, a statistically stable pulse may be transmitted.

In an alternative embodiment of this invention, a first plurality of optical fiber segments may be formed (extracted) from a first optical fiber. A length of each of the first plurality of optical fiber segments may be less than or approximate the correlation scale. Alternatively, the length of each of the first plurality of optical fiber segments may be distributed between approximately zero and approximately two to three times the correlation scale (quasi-periodic pinning).

Then, the predicted accumulated chromatic dispersion along each of the first plurality of optical fiber segments is determined. An actual accumulated chromatic dispersion along each of the first plurality of optical fiber segments is also determined. A pinning point is located on each of the first plurality of optical fiber segments. If no such point exists within an optical fiber segment, the segment should be discarded.

Each of the first plurality of optical fiber segments is then severed at the point to form a second plurality of optical fiber segments. Next, each of the second plurality of optical fiber segments is joined to form a second optical fiber.

Another embodiment uses compensating strands to generate pinning points. Initially, a plurality of points may be identified along an optical fiber. Thereafter, a predicted accumulated chromatic dispersion may be determined at each of the plurality of points on the optical fiber. Next, an actual accumulated chromatic dispersion may be determined at each of the plurality of points.

Thereafter, a compensating strand of optical fiber may be inserted at each of the plurality of points. Each compensating strand of optical fiber may be configured to alter the actual accumulated chromatic dispersion at an associated one of the plurality of points such that the actual accumulated chromatic dispersion approximates the predicted accumulated chromatic dispersion at an end of each compensating strand.

A distance between an end of each consecutive compensating strand may approximate or be less than a correlation scale. Alternatively, as one would expect, a distance between the end of each consecutive compensating strand may be distributed between approximately zero and approximately two to three times the correlation scale.

It should be noted that this invention, in its various embodiments, may be implemented in connection with single-mode and multi-mode fibers. It may also be implemented in connection with various types of telecommunication fibers including, but not limited to, dispersion management fiber, fiber having constant positive predicted dispersion, dispersion shifted fiber, dispersion flattened fiber, large effective area optical fiber (LEAF), optical fiber with dispersion management of second and third order dispersion, and any combination thereof. Additionally, both non-linear (soliton-based) and linear transmission methods may be used.

The features and advantages of the present invention will become more fully apparent from the following description and appended claims, or may be learned by the practice of the invention as set forth hereinafter.

BRIEF DESCRIPTION OF THE DRAWINGS

In order that the manner in which the above recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of this invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 9, is not intended to limit the scope of the invention, as claimed, but is merely representative of presently preferred embodiments of the invention.

Figure 1:
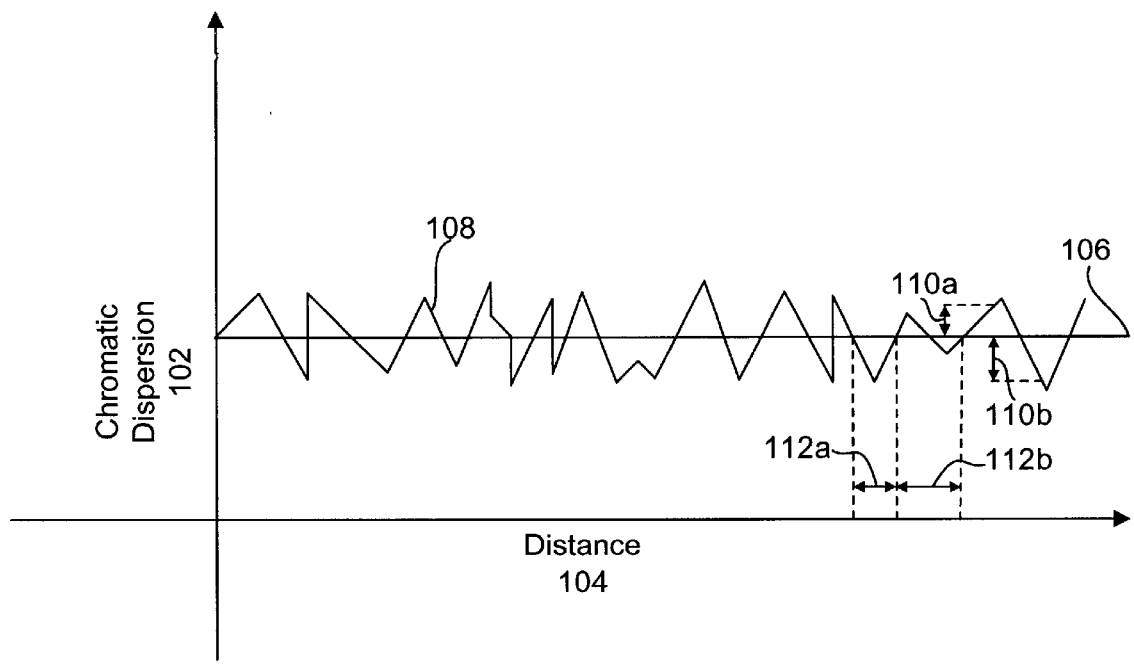
FIG. 1 is a chart illustrating predicted chromatic dispersion in relation to the actual (random) chromatic dispersion.

With reference to FIG. 1, there is shown a chart having first axis 102 indicating chromatic dispersion in relation to second axis 104 indicating distance along an optical fiber. A first line 106 indicates predicted chromatic dispersion. Predicted chromatic dispersion is the chromatic dispersion that is a function of length of the optical fiber. For example, for an optical fiber having constant positive predicted dispersion, the predicted dispersion may be calculated by dividing total accumulated dispersion along the fiber by the length of the fiber in kilometers. The predicted dispersion may be measured in units of picoseconds of pulse spreading per nanometer of spectral width of the optical signal per kilometer of fiber length. The spectral width is the range of wavelengths within a particular optical signal.

Dispersion management fibers may involve alternating strands of positive- and negative-dispersion fiber. Thus, in a dispersion management fiber, the predicted value of dispersion may be the average dispersion per unit of length within each alternating strand.

The randomness of the chromatic dispersion is illustrated by the vacillating nature of a second line 108. Thus, while on average the predicted dispersion is accurate, the vacillation around this predicted value represents random, or actual, chromatic dispersion. Random chromatic dispersion has often historically been ignored. However, when transmission speeds increase such that an operational pulse width is in the order of picoseconds, random chromatic dispersion will eventually destroy the pulses.

The variation of actual chromatic dispersion relative to be predicted chromatic dispersion of a particular optical fiber may be referred to as dispersion noise strength or noise intensity. Noise strength may be defined as average deviation 110a–b of the actual chromatic dispersion from the predicted chromatic dispersion squared ($d_{var}^2$) times the average distance 112a–b between intersections of the predicted and actual chromatic dispersion ($z_{var}$), or $$D = d_{var}^2 z_{var}.$$

Chromatic dispersion also accumulates or increases with distance along an optical fiber. The area between the second axis 104, which represents distance, and the first line 106, which represents predicted chromatic dispersion, indicates the predicted accumulated chromatic dispersion. The area between the second axis 104 and the second line 108, which represents actual chromatic dispersion, indicates the actual accumulated chromatic dispersion.

Figure 2:
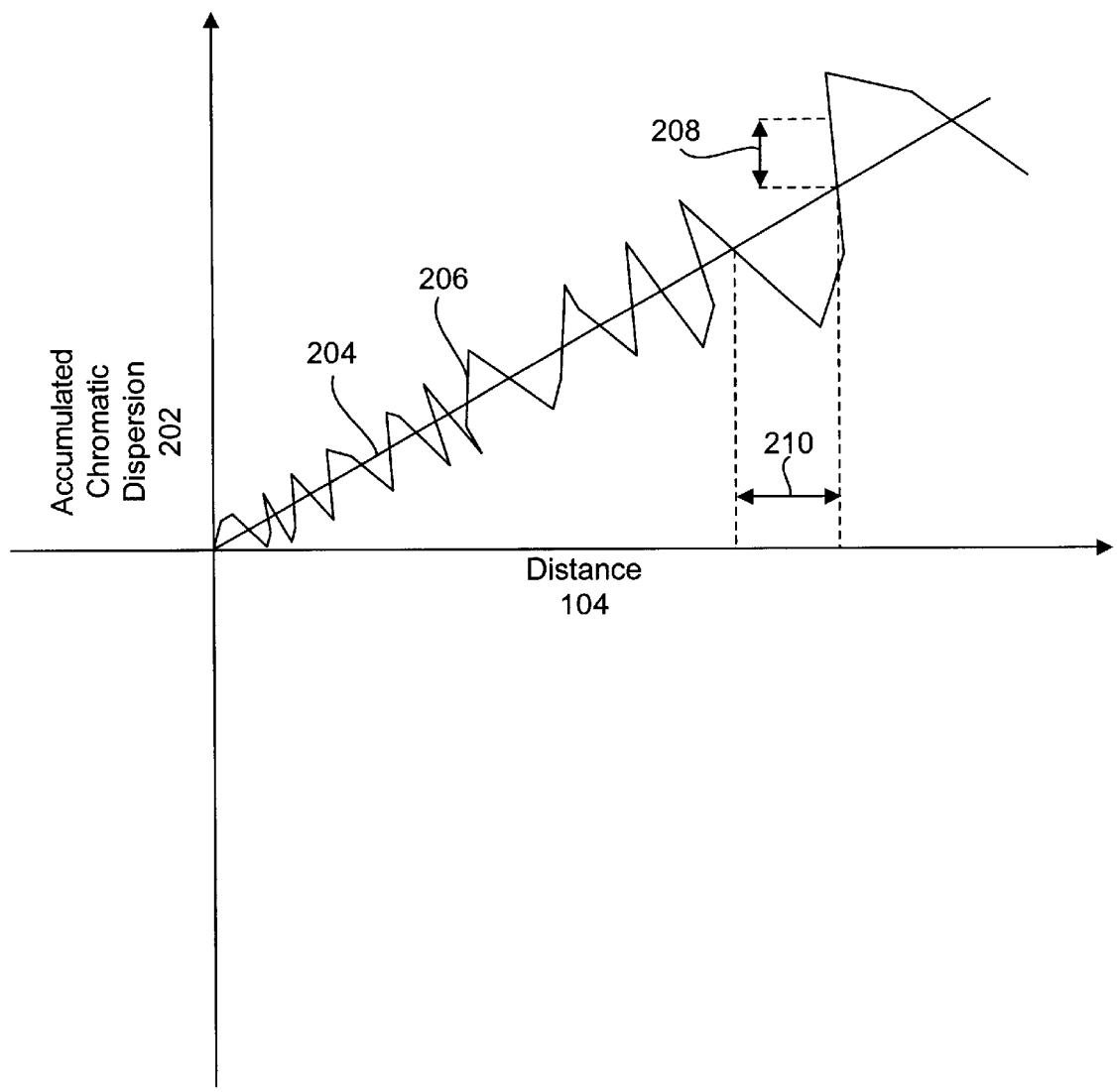
FIG. 2 is a chart illustrating predicted accumulated chromatic dispersion in relation to actual accumulated chromatic dispersion.

Referring now to FIG. 2, there is shown a chart having first axis 202 indicating accumulated chromatic dispersion and a second axis 104 indicating distance along an optical fiber. A first line 204 indicates predicted accumulated chromatic dispersion, while a second line 206 indicates actual (random) accumulated chromatic dispersion. As FIG. 2 shows, the predicted accumulated chromatic dispersion increases linearly as distance along an optical fiber increases.

FIG. 2 illustrates dispersion for a fiber having constant positive predicted dispersion. Predicted accumulated dispersion for a dispersion management fiber that has alternating strands of positive-and negative-dispersion fiber could be illustrated with alternating sections that linearly increase and decrease, respectively. Of course, on such a graph, actual accumulated chromatic dispersion varies around the predicted accumulated dispersion.

It should be noted that actual accumulated dispersion varies more dramatically from the predicted accumulated dispersion as distance along an optical fiber increases. Stated more specifically, the distance 210 between intersections of the actual and predicted accumulated dispersion increases on average and the average vertical distance 208 between the actual and predicted accumulated dispersion also increases. If unchecked, this increased variation results in pulse broadening and eventual pulse destruction when transmission speeds are sufficiently fast (i.e., a pulse width is in the order of picoseconds). As explained in greater detail below, dispersion noise strength and operating pulse width of a signal determine how quickly random chromatic dispersion will destroy a pulse.

Figure 3:
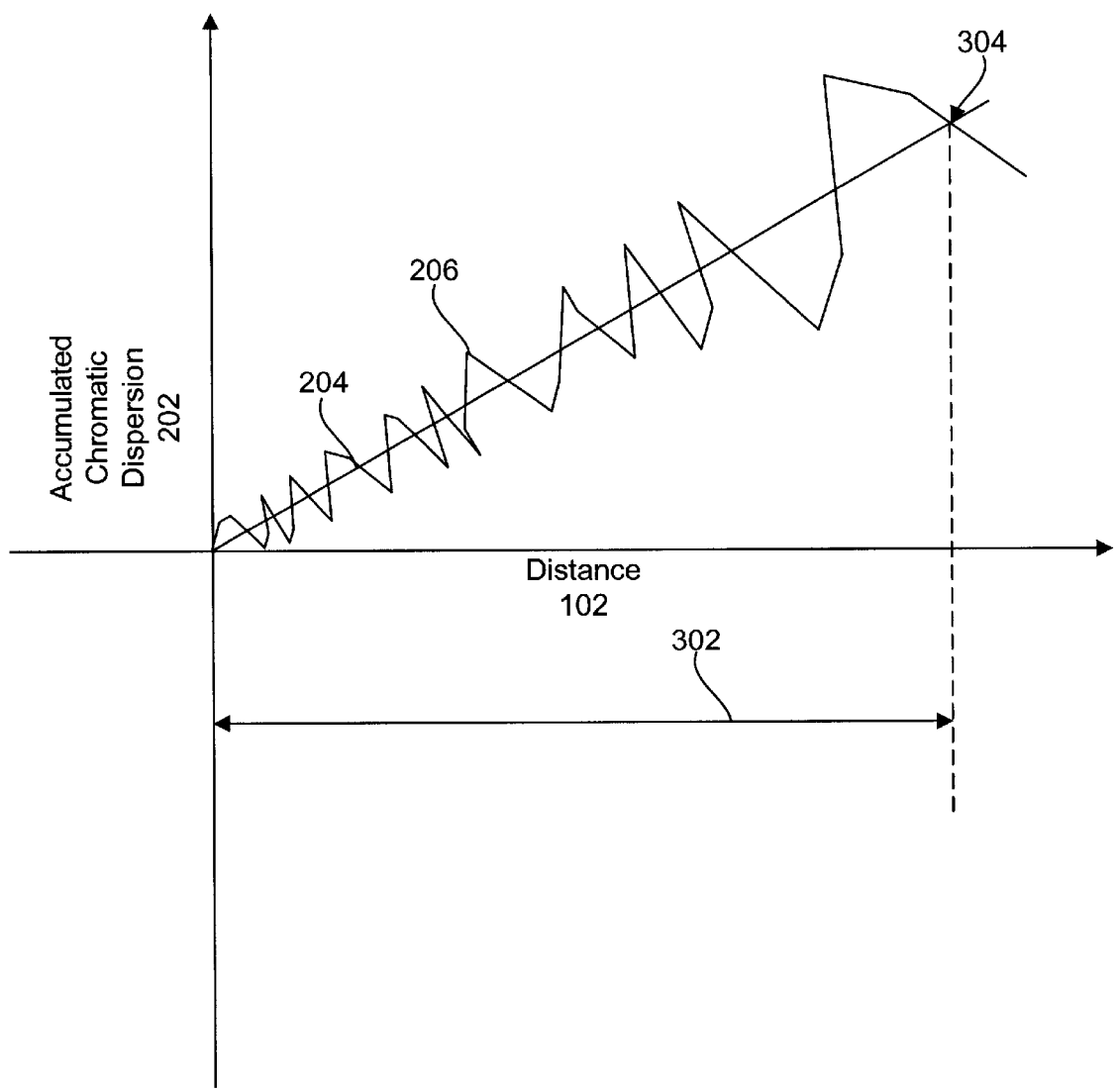
FIG. 3 illustrates a point where predicted accumulated chromatic dispersion approximates actual accumulated chromatic dispersion.

Referring now to FIG. 3, there is shown a graph illustrating a distance 302 within which the actual accumulated chromatic dispersion is pinned to (approximate) the predicted accumulated dispersion in order to minimize the danger of pulse destruction. This distance 302 may be referred to as a correlation scale, $Z_\xi$, and is defined by the following formula:

$$Z_\xi = \tau^4 / D,$$

where $\tau$ is an operational pulse width, the pulse width at which a signal is transmitted along an optical fiber. In one implementation, to be conservative, the operational pulse width of the signal is a width of a shortest pulse expected to travel along the optical fiber.

If the actual accumulated dispersion does not periodically approximate (is not pinned to) the predicted accumulated dispersion within a distance shorter than or approximately equal to the correlation scale, a pulse may be destroyed. Stated differently, beyond the correlation scale there may be no correlation, or relationship, between the input signal and the output signal, e.g., in digital communication a 0 or a 1. In addition, as will be explained in greater detail below, effective pinning may also be performed in a quasi-periodic fashion.

As discussed in greater detail below, naturally occurring points 304 ("pinning points") where the actual accumulated dispersion approximates the predicted accumulated dispersion and artificially generated points (also, "pinning points") (i.e., using compensating strands optical fiber to alter the actual accumulated dispersion) may be implemented in connection with this invention.

Figure 4:
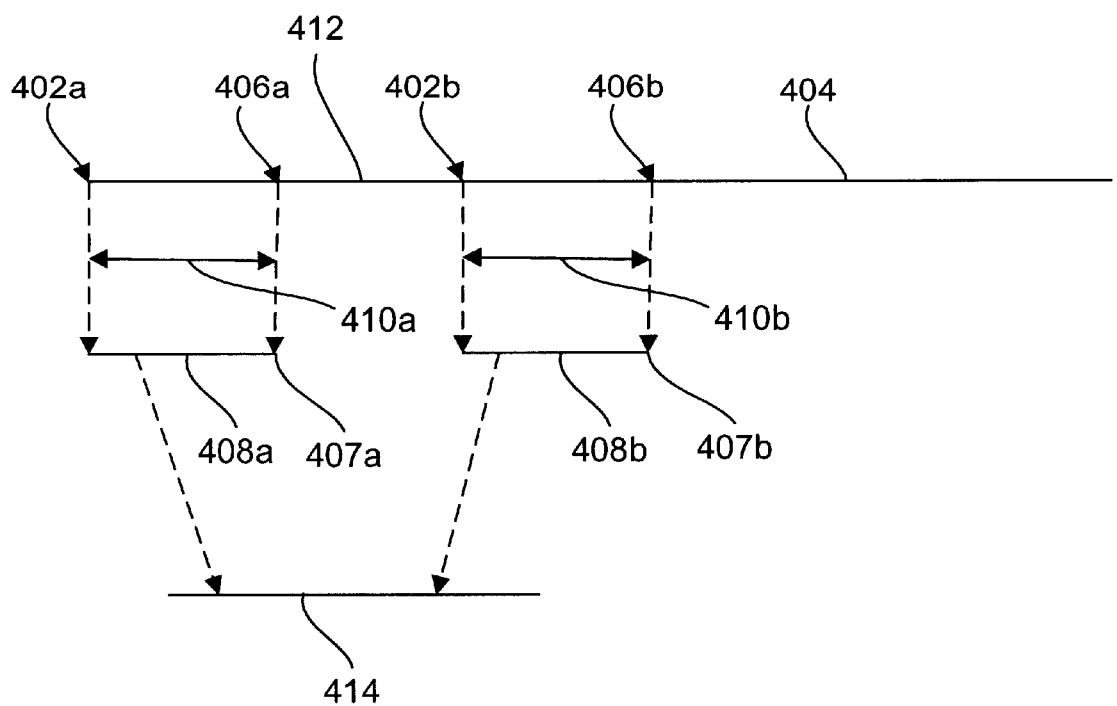
FIG. 4 illustrates a method of manufacturing optical fiber that decreases pulse degradation resulting from random chromatic dispersion.

With reference to FIG. 4, there is illustrated a method of periodically pinning the actual accumulated dispersion to predicted accumulated dispersion. It should be initially noted that this invention, in its various embodiments, may be implemented in connection with single-mode and multi-mode fibers. It may also be implemented with a dispersion management fiber or a fiber having constant positive predicted dispersion. Additionally, both non-linear (soliton-based) and linear transmission methods may be used.

In implementing this method, a predicted accumulated dispersion may be determined from a first point 402a–b along a first optical fiber 404. The first point 402a–b may be the beginning of the first optical fiber 404, as illustrated in FIG. 4 at 402a. Of course, it should be recognized that optical fibers may transmit information in both directions along the fiber. Thus, an optical fiber may be viewed as having two beginnings, one at each end. It should also be noted that the first point 402b could also be any point located between the two ends of the first optical fiber 404. In practice, the first optical fiber 404 may actually involve a plurality of optical fibers.

Those skilled in the art may recognize that there are various ways for determining predicted accumulated dispersion. Two of them were briefly discussed in connection with FIG. 1 herein.

Following calculation of the predicted accumulated dispersion, the actual accumulated dispersion from the first point 402a–b along the first optical fiber 404 may be determined. Again, this may be gleaned in various ways known to those skilled in the art.

Thereafter, a pinning point 406a–b, where the actual accumulated dispersion approximates the predicted accumulated dispersion, may be located. Next, an optical fiber segment 408a–b spanning from the first point 402 to the pinning point 406 may be formed. Thus, the actual accumulated dispersion approximates the predicted accumulated dispersion at an end 407a–b of the optical fiber segment 408a–b. As illustrated in FIG. 4, the optical fiber segment 408a may be formed by simply cutting the first optical fiber 404 at the pinning point 406a. However, if the first point 402b is not located at one end of the first optical fiber 404, the first optical fiber 404 must also be cut at that first point 402b to form an optical fiber segment 408b.

A length 410a–b of the optical fiber segment 408 may be approximately equal or less than the correlation scale, as described above. The correlation scale may be calculated by an examination of either the first optical fiber 404 or the optical fiber segment 408. Alternatively, the length of the optical fiber segment 408a–b may be distributed between approximately zero and approximately two to three times the correlation scale (quasi-period pinning). Of course, quasi-periodic pinning may involve various other similar ranges, such as between one half times the correlation scale and one and one half times the correlation scale.

As a result of this length 410a–b limitation, certain segments 412 of the first optical fiber 404 may be of no use. This is because within those segments 412 the actual accumulated dispersion does not approximate the predicted accumulated dispersion within the correlation scale (or, alternatively, one and a half times the correlation scale).

The optical fiber segments 408a–b may be joined to form a second optical fiber 414 using any suitable method. Obviously, in implementing this technique, more than two optical fiber segments 408 may be joined to form the second optical fiber 414. Also, it should be noted that the optical fiber segments 408a–b may be formed from different first optical fibers 404. The second optical fiber 414, as explained above, minimizes pulse degradation resulting from random chromatic dispersion. Pulse degradation may involve any aspect of pulse deterioration, such as distortion of the pulse shape or displacement of the pulse from its expected position relative to adjacent pulses.

Figure 5:
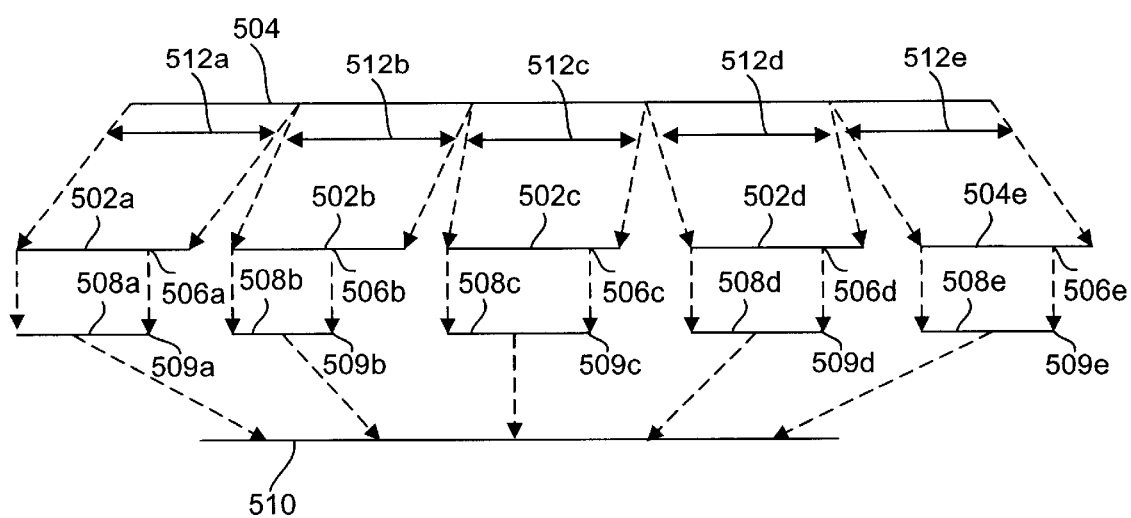
FIG. 5 illustrates an alternative method of manufacturing optical fiber that decreases pulse degradation resulting from random chromatic dispersion.

Referring now to FIG. 5, there is illustrated an alternative embodiment of this invention. A first plurality of optical fiber segments 502a–e may be formed (extracted) from a first optical fiber 504. Thereafter, the predicted accumulated chromatic dispersion along each of the first plurality of optical fiber segments 502a–e is determined. An actual accumulated chromatic dispersion along each of the first plurality of optical fiber segments 502a–e is also determined. A point 506a–e on each of the first plurality of optical fiber segments 502a–e where the predicted accumulated chromatic dispersion approximates the accumulated dispersion is located. If no such point exists within an optical fiber segment 502a–e, the segment 502a–e should be discarded.

Thereafter, each of the first plurality of optical fiber segments 502a–e is severed at the point 506a–e to form a second plurality of optical fiber segments 508a–e. Thus, the actual accumulated dispersion approximates the predicted accumulated dispersion at an end 509a–e of each of the second plurality of optical fiber segments 508a–e. Next, each of the second plurality of optical fiber segments 508a–e is joined to form a second optical fiber 510.

The length 512a–e of each of the first plurality of optical fiber segments 502a–e may be less than or approximately equal to the correlation scale. Alternatively, the length 512a–e of each of the first plurality of optical fiber segments 502a–e may be distributed between approximately zero and approximately two to three times the correlation scale (quasi-periodic pinning).

Figure 6:
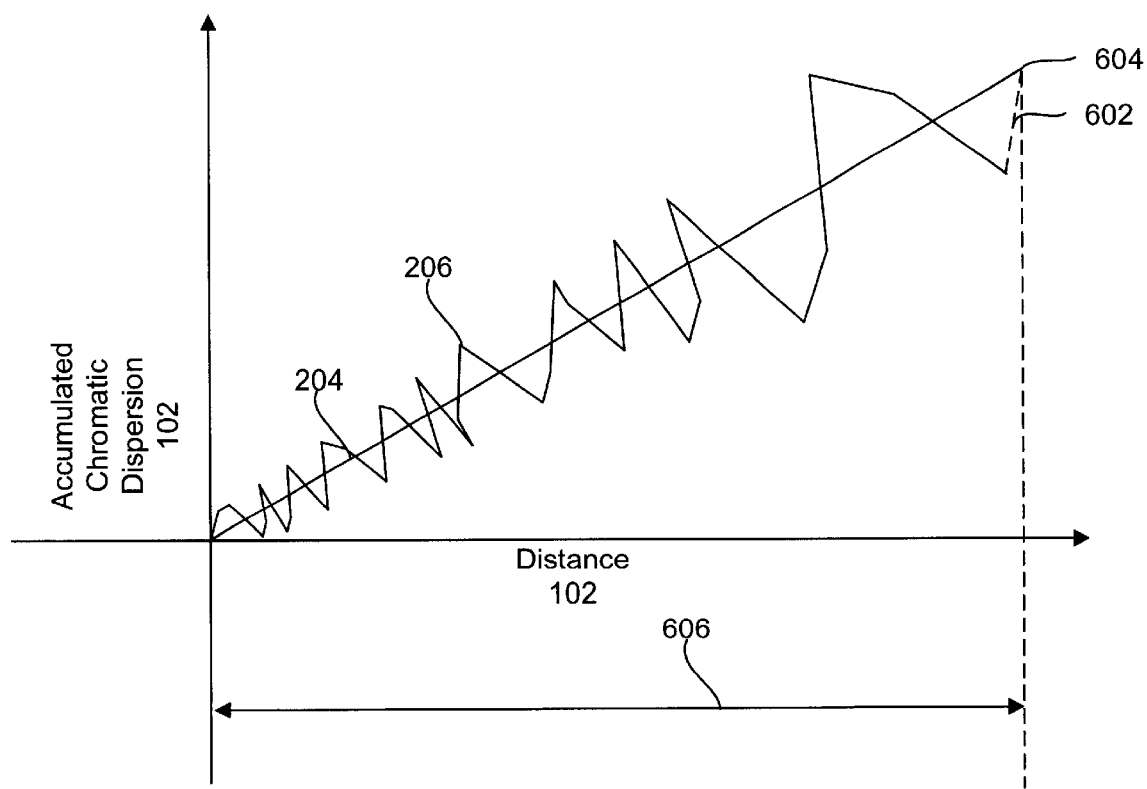
FIG. 6 illustrates an effect of a compensating strand of optical fiber on actual chromatic dispersion.

With reference to FIG. 6, there is illustrated an effect 602 of a compensating strand of optical fiber on actual chromatic dispersion. As illustrated, a compensating strand of optical fiber may be used to alter the actual chromatic dispersion to approximate the predicted chromatic dispersion at a point 604, a pinning point.

Compensating strands of optical fiber, although used for different purposes, are known to those skilled in the art. A compensating strand of optical fiber having either positive or negative dispersion may be used to direct the actual chromatic dispersion toward the predicted chromatic dispersion and eventually approximate it.

As with previously discussed embodiments, the actual chromatic dispersion may periodically approximate the predicted dispersion within a specified length 606 of optical fiber, or less, in order to minimize pulse degradation resulting from random dispersion.

Figure 7:
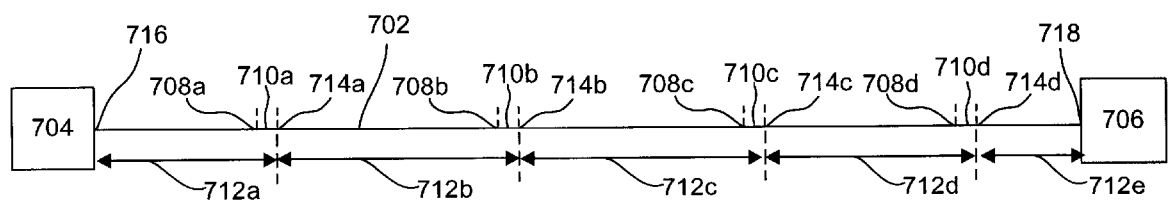
FIG. 7 illustrates one embodiment of this invention that decreases pulse degradation resulting from random chromatic dispersion using compensating strands of optical fiber.

FIG. 7 illustrates use of compensating strands of optical fiber to decrease pulse degradation resulting from random chromatic dispersion. For purposes of this illustration, data is transmitted along an optical fiber 702 from a transmitter 704 to receiver 706. Obviously, data may be transmitted in both directions in an optical fiber 702.

Initially, a plurality of points 708a–d may be identified along an optical fiber 702. Thereafter, a predicted accumulated chromatic dispersion may be determined at each of the plurality of points 708a–d on the optical fiber 704. Next, an actual accumulated chromatic dispersion may be determined at each of the plurality of points 708a–d.

It should be noted that previously discussed methods required a more extensive analysis of the optical fiber 704. Here, the only data needed is the predicted and actual accumulated dispersion at each point 708a–d. Previously discussed methods require a determination of predicted and actual accumulated dispersion along the optical fiber 704 to determine when the actual accumulated dispersion approximates the predicted accumulated dispersion.

After making these determinations at each point 708a–d, a compensating strand of optical fiber 710a–d may be inserted at each of the plurality of points 708a–d. The predicted and actual accumulated dispersion may be altered by previously inserted compensating strands of optical fiber 710a–d. In one embodiment, such alterations may be taken into consideration in determining the predicted and actual accumulated dispersion for subsequently inserted compensating strands 710a–d. Each compensating strand of optical fiber 710a–d may be configured to alter the actual accumulated chromatic dispersion at an associated one of the plurality of points 708a–d such that the actual accumulated chromatic dispersion approximates the predicted accumulated chromatic dispersion at an end 714a–d of each compensating strand.

A distance 712b–d between an end 714a–d of each consecutive compensating strand 710a–d may approximate or be less than a correlation scale. Also, a distance 712a between a beginning 716 of the optical fiber 702 and the end 708a of a first compensating strand 710a (and also the end 714d of the last compensating strand 710d and the end 718 of the optical fiber 702) may also approximate or be less than a correlation scale. Alternatively, a distance 712a–e between the end 708a–d of each consecutive compensating strand 710a–d and the beginning 716 and end 718 may be distributed between approximately zero and approximately two to three times the correlation scale (quasi-periodic pinning).

It should be noted that in various embodiments of the present invention, the pinning points do not necessarily occur at an end of each compensating strand 710, optical fiber segment 408 or 508, or optical fiber, but may occur at other points within the respective compensating strands 710, optical fiber segments 408 or 508, or optical fibers. In such embodiments, pulse degradation resulting from chromatic dispersion may be minimized when a distance between each consecutive pinning point is approximately equal to or less than the correlation scale. Alternatively, pulse degradation resulting from chromatic dispersion may be minimized if a distance between consecutive pinning points is distributed between zero and two to three times the correlation scale (quasi-periodic).

As stated before, it should be noted that this invention, in its various embodiments, may be implemented in connection with single-mode and multi-mode fibers. It may also be implemented in connection with various types of telecommunication fibers including, but not limited to, dispersion management fiber, fiber having constant positive predicted dispersion, dispersion shifted fiber, dispersion flattened fiber, large effective area optical fiber (LEAF), optical fiber with dispersion management of second and third order dispersion, any combination thereof, and any variations thereof. Additionally, both non-linear (soliton-based) and linear transmission methods may be used. Those skilled in the art will recognized that the apparatuses and techniques of the present invention may be implemented in connection with many types of fibers.

Figure 8:
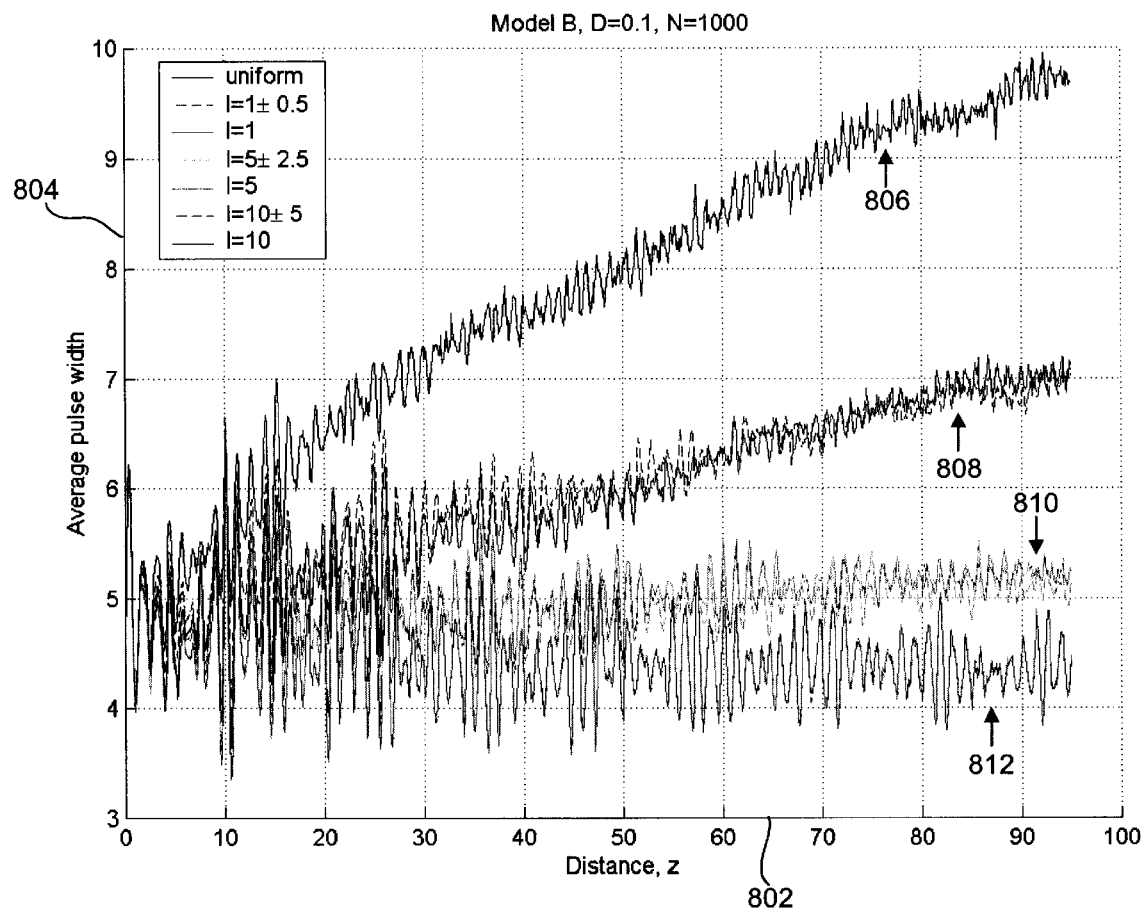
FIG. 8 is a mathematically simulated chart illustrating a statistically steady state of average pulse width though implementing one embodiment of this invention.

FIG. 8 is a mathematically simulated chart illustrating a statistically steady state of average pulse width implementing one embodiment of this invention. Here, a horizontal axis 802 indicates distance along an optical fiber, while a vertical axis 804 indicates average pulse width. The simulation shown in FIG. 8 relates to a dispersion management fiber with alternating strands of positive and negative dispersion. The noise strength (D) is low with a value of 0.1. The simulated distance is represented by 100 units (dimensionless). A first line 806 indicates how a pulse width rapidly increases (degrades) with distance when no pinning is implemented. A first cluster of lines 808 indicates less of an increasing pulse width when pinning occurs every 10 units (indicated by a solid line) and quasi-periodically, 10±5 (dashed line). A second cluster of lines 810 indicates an additional stabilization in pulse width when pinning occurs every 5 units (solid line) and quasi-periodically, 5±2.5 (dashed line). A third cluster of lines 812 indicates further stabilization in pulse width when pinning occurs every at every unit (solid line) and quasi-periodically, 1±0.5 (dashed line). The third cluster 812 indicates a statistically steady state, demonstrating the tremendous benefit of use of the present invention.

Figure 9:
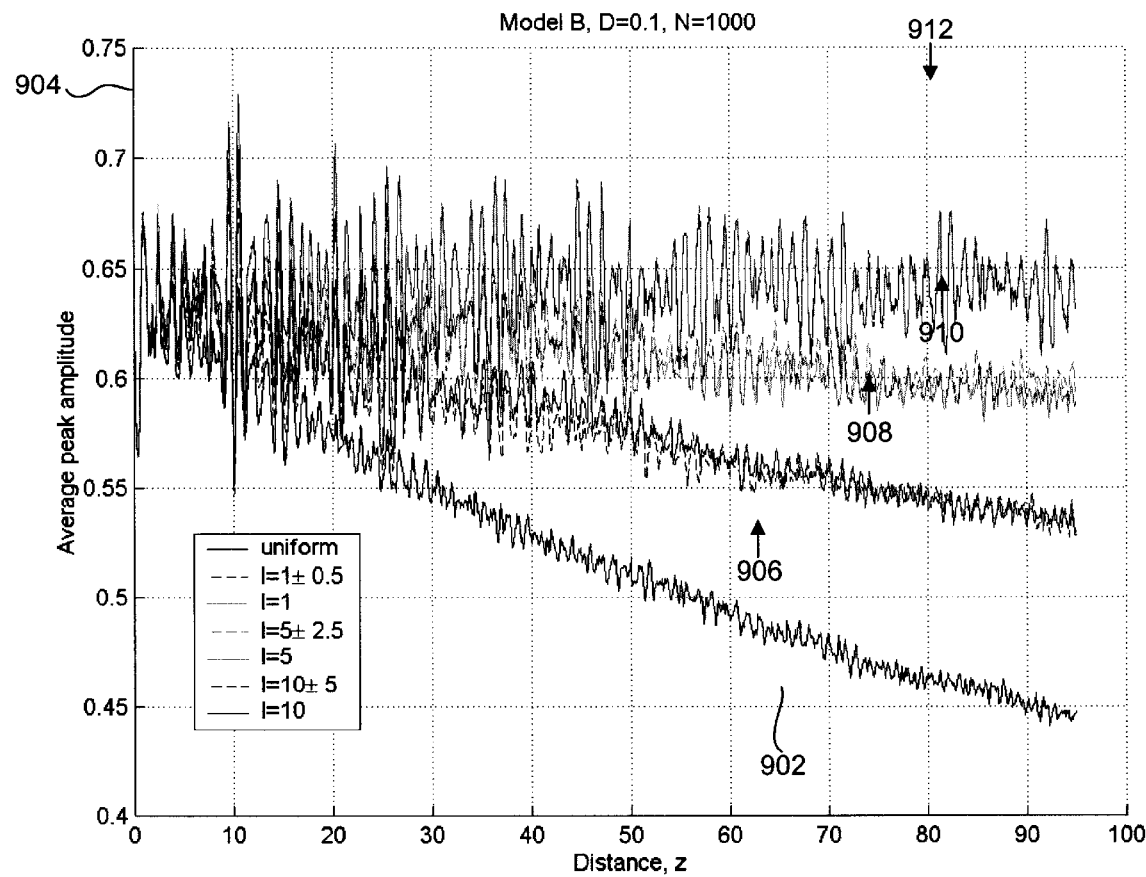
FIG. 9 is a mathematically simulated chart illustrating a statistically steady state of average pulse amplitude through implementing one embodiment of this invention.

FIG. 9 is a mathematically simulated chart illustrating a statistically steady state of average pulse amplitude implementing one embodiment of this invention. A horizontal axis 902 indicates distance, while a vertical axis 904 indicates average peak amplitude. As with the FIG. 8, the simulation shown in FIG. 9 relates to a dispersion management fiber. Again, the noise strength (D) is low with a value of 0.1. A first line 906 indicates how pulse amplitude decreases (degrades) with distance when no pinning is implemented. A first cluster of lines 908 indicates less degradation in pulse amplitude when pinning occurs every 10 units (solid line) or quasi-periodically, 10±5 (dashed line). A second cluster of lines 910 indicates an additional stabilization in pulse amplitude when pinning occurs every 5 units (solid line) and quasi-periodically, 5±2.5 (dashed line). A third cluster of lines 912 indicates an additional stabilization of pulse amplitude when pinning occurs periodically at every unit (solid line) and quasi-periodically, 1±0.5 (dashed line). The third cluster 912 indicates the statistically steady state of the pulse amplitude.

The methods and apparatuses of the present invention provide substantial advantages over the prior art. Signal degradation resulting from random chromatic dispersion is minimized using simple techniques for modification of existing and newly manufactured optical fibers. Following manufacture or retrofitting, no additional expense or intervention is required. Thus, the methods and apparatuses of the present invention enable higher transmission rates with relatively inexpensive changes to present optical fibers and optical fiber manufacturing methods.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A method of decreasing pulse degradation resulting from random chromatic dispersion in an optical fiber, the method comprising:
   determining a predicted accumulated chromatic dispersion at a point on an optical fiber (finding nominal dispersion 20);
   determining (approximating actual dispersion) an actual accumulated chromatic dispersion at the point; and
   inserting a compensating strand of optical fiber at the point, the compensating strand configured to alter the actual accumulated chromatic dispersion such that the actual accumulated chromatic dispersion approximates the predicted accumulated chromatic dispersion at a pinning point within the compensating strand.

2. The method of claim 1, wherein the pinning point is located at an end of the compensating strand of optical fiber.

3. The method of claim 1, wherein the optical fiber comprises a beginning, and wherein a distance between the beginning of the optical fiber and the pinning point approximates a correlation scale, the correlation scale being an operational pulse width of a signal raised to the fourth power divided by a dispersion noise strength.

4. The method of claim 3, wherein the operational pulse width of the signal is a width of a shortest pulse expected to travel along the optical fiber.

5. The method of claim 1, wherein the optical fiber comprises a beginning, and wherein a distance between the beginning of the optical fiber and the pinning point is less than a correlation scale, the correlation scale being an operational pulse width of a signal raised to the fourth power divided by a dispersion noise strength.

6. The method of claim 1, wherein the optical fiber comprises a beginning, and wherein a distance between the beginning of the optical fiber and the pinning point is between approximately zero and approximately two times the correlation scale, the correlation scale being an operational pulse width of a signal raised to the fourth power divided by a dispersion noise strength.

7. The method of claim 1, wherein the optical fiber is a single-mode fiber.

8. The method of claim 1, wherein the optical fiber is a multi-mode fiber.

9. The method of claim 1, wherein the optical fiber is selected from a group consisting of dispersion managed fiber, dispersion shifted fiber, dispersion flattened fiber, large effective area optical fiber (LEAF), and dispersion management fiber of second and third order dispersion.

10. The method of claim 1, wherein the optical fiber has constant positive predicted dispersion.

11. The method of claim 1, wherein the optical fiber is configured to transmit a signal using a soliton-based transmission method.

12. The method of claim 1, wherein the optical fiber is configured to transmit a signal using a linear transmission method.

13. A method of decreasing pulse degradation resulting from random chromatic dispersion in an optical fiber, the method comprising:
   identifying a plurality of points along an optical fiber;
   determining a predicted accumulated chromatic dispersion at each of the plurality of points on the optical fiber;
   determining an actual accumulated chromatic dispersion at each of the plurality of points; and
   inserting a compensating strand of optical fiber at each of the plurality of points, each compensating strand of optical fiber configured to alter the actual accumulated chromatic dispersion at an associated one of the plurality of points such that the actual accumulated chromatic dispersion approximates the predicted accumulated chromatic dispersion at a pinning point within each compensating strand.

14. The method of claim 13, wherein the pinning point is located at an end of each compensating strand of optical fiber.

15. The method of claim 13, wherein a distance between each consecutive pinning point approximates a correlation scale, the correlation scale being an operational pulse width of a signal raised to the fourth power divided by a dispersion noise strength.

16. The method of claim 14, wherein the operational pulse width of the signal is a width of a shortest pulse that is expected to travel along the optical fiber.

17. The method of claim 13, wherein a distance between each consecutive pinning point is less than a correlation scale, the correlation scale being an operational pulse width of a signal raised to the fourth power divided by a dispersion noise strength.

18. The method of claim 13, wherein a distance between each consecutive pinning point is distributed between approximately zero and approximately two times the correlation scale, the correlation scale being an operational pulse width of a signal raised to the fourth power divided by a dispersion noise strength.

19. The method of claim 13, wherein the optical fiber is a single-mode fiber.

20. The method of claim 13, wherein the optical fiber is selected from a group consisting of dispersion managed fiber, fiber having constant positive predicted dispersion, dispersion shifted fiber, dispersion flattened fiber, large effective area optical fiber (LEAF), and dispersion management fiber of second and third order dispersion.

21. The method of claim 13, wherein the optical fiber is configured to transmit a signal using a soliton-based transmission method.

22. A method of manufacturing an optical fiber that decreases pulse degradation resulting from random chromatic dispersion, the method comprising:
   determining a predicted accumulated chromatic dispersion from a first point along an optical fiber;
   determining an actual accumulated chromatic dispersion from the first point along the optical fiber;
   locating a pinning point on the optical fiber where the actual accumulated chromatic dispersion approximates the predicted accumulated chromatic dispersion; and
   forming an optical fiber segment spanning from the first point to the pinning point.

23. The method of claim 22, wherein the first point is an end of the optical fiber.

24. The method of claim 22, wherein a length of the optical fiber segment approximates a correlation scale, the correlation scale being an operational pulse width of a signal raised to the fourth power divided by a dispersion noise strength.

25. The method of claim 24, wherein the operational pulse width of the signal is a width of a shortest pulse expected to travel along the second optical fiber.

26. The method of claim 22, wherein a length of the optical fiber segment is less than a correlation scale, the correlation scale being an operational pulse width of a signal raised to the fourth power divided by a dispersion noise strength.

27. The method of claim 22, wherein a length of the optical fiber segment is between approximately zero and approximately two times the correlation scale, the correlation scale being an operational pulse width of a signal raised to the fourth power divided by dispersion noise strength.

28. The method of claim 22, wherein the optical fiber is a single-mode fiber.

29. The method of claim 22, wherein the optical fiber is selected from a group consisting of dispersion managed fiber, fiber having constant positive predicted dispersion, dispersion shifted fiber, dispersion flattened fiber, large effective area optical fiber (LEAF), and dispersion management fiber of second and third order dispersion.

30. The method of claim 22, wherein the optical fiber segment is configured to transmit a signal using a soliton-based transmission method.

31. A method of manufacturing an optical fiber that decreases pulse degradation resulting from random chromatic dispersion, the method comprising:
    forming a plurality of optical fiber segments, each segment being formed by:
        determining a predicted accumulated chromatic dispersion from a first point along a first optical fiber;
        determining an actual accumulated chromatic dispersion from the first point along the first optical fiber;
        locating a pinning point on the first optical fiber where the actual accumulated chromatic dispersion approximates the predicted accumulated chromatic dispersion; and
        forming one of the optical fiber segments spanning from the first point to the pinning point; and
    joining the plurality of optical fiber segments to form a second optical fiber.

32. The method of claim 29, wherein a length of each optical fiber segment approximates a correlation scale, the correlation scale being an operational pulse width of a signal raised to the fourth power divided by a dispersion noise strength.

33. The method of claim 29, wherein a length of each optical fiber segment is less than a correlation scale, the correlation scale being an operational pulse width of a signal raised to the fourth power divided by a dispersion noise strength.

34. The method of claim 29, wherein a length of each optical fiber segment is distributed between approximately zero and approximately two times the correlation scale, the correlation scale being an operational pulse width of a signal raised to the fourth power divided by a dispersion noise strength.

35. The method of claim 29, wherein the first optical fiber is a single-mode fiber.

36. The method of claim 29, wherein the first optical fiber selected from a group consisting of dispersion managed fiber, fiber having constant positive predicted dispersion, dispersion shifted fiber, dispersion flattened fiber, large effective area optical fiber (LEAF), and dispersion management fiber of second and third order dispersion.

37. The method of claim 29, wherein the second optical fiber is configured to transmit a signal using a soliton-based transmission method.

38. A method of manufacturing an optical fiber that decreases pulse degradation resulting from random chromatic dispersion, the method comprising:
    forming a first plurality of optical fiber segments from at least one first optical fiber;
    determining a predicted accumulated chromatic dispersion along each of the first plurality of optical fiber segments;
    determining an actual accumulated chromatic dispersion along each of the first plurality of optical fiber segments;
    locating a point on each of the first plurality of optical fiber segments where the actual accumulated chromatic dispersion approximates the predicted accumulated chromatic dispersion; and
    severing each of the first plurality of optical fiber segments at the point to form a second plurality of optical fiber segments; and
    joining each of the second plurality of optical fiber segments to form a second optical fiber.

39. The method of claim 38, further comprising:
    determining a correlation scale, the correlation scale being an operational pulse width of a signal raised to the fourth power divided by a dispersion noise strength, and
    wherein a length of each of the first plurality of optical fiber segments approximates the correlation scale.

40. The method of claim 39, wherein the operational pulse width of the signal is a width of a shortest pulse expected to travel along the second optical fiber.

41. The method of claim 38, further comprising:
    determining a correlation scale, the correlation scale being an operational pulse width of a signal raised to the fourth power divided by a dispersion noise strength, and
    wherein a length of each of the first plurality of optical fiber segments is less than the correlation scale.

42. The method of claim 38, further comprising:
    determining a correlation scale, the correlation scale being an operational pulse width of a signal raised to the fourth power divided by a dispersion noise strength, and
    wherein a length of each of the first plurality of optical fiber segments is distributed between approximately zero and approximately two times the correlation scale.

43. The method of claim 38, wherein the first optical fiber is a single-mode fiber.

44. The method of claim 38, wherein the first optical fiber is selected from a group consisting of dispersion managed fiber, fiber having constant positive predicted dispersion, dispersion shifted fiber, dispersion flattened fiber, large effective area optical fiber (LEAF), and dispersion management fiber of second and third order dispersion.

45. The method of claim 38, wherein the second optical fiber is configured to transmit a signal using a soliton-based transmission method.

46. An optical fiber minimizing pulse degradation resulting from random chromatic dispersion, the fiber comprising:
    an optical fiber having a predicted accumulated dispersion, an actual accumulated dispersion, and a compensating strand of optical fiber; and
    wherein the compensating strand is configured to alter the actual accumulated chromatic dispersion such that the actual accumulated chromatic dispersion approximates the predicted accumulated chromatic dispersion at a pinning point within the compensating strand.

47. The optical fiber of claim 46, wherein the pinning point is located on an end of the compensating strand.

48. The optical fiber of claim 46, wherein the optical fiber further comprises a beginning, and wherein a distance between the beginning and the pinning point approximates a correlation scale, the correlation scale being an operational pulse width of a signal raised to the fourth power divided by a dispersion noise strength.

49. The optical fiber of claim 47, wherein the operational pulse width of the signal is a width of a shortest pulse expected to travel along the optical fiber.

50. The optical fiber of claim 46, wherein the optical fiber further comprises a beginning, and wherein a distance between the beginning and the pinning point is less than a correlation scale, the correlation scale being an operational pulse width of a signal raised to the fourth power divided by a dispersion noise strength.

51. The optical fiber of claim 44, wherein the optical fiber further comprises a beginning, and wherein a distance between the beginning and the pinning point is between approximately zero and approximately two times the correlation scale, the correlation scale being an operational pulse width of a signal raised to the fourth power divided by a dispersion noise strength.

52. An optical fiber segment minimizing pulse degradation resulting from random chromatic dispersion, the optical fiber segment made by a method comprising:

determining a predicted accumulated chromatic dispersion from a first point along an optical fiber;

determining an actual accumulated chromatic dispersion from the first point along the optical fiber;

locating a pinning point on the optical fiber where the actual accumulated chromatic dispersion approximates the predicted accumulated chromatic dispersion; and forming an optical fiber segment having the pinning point therein.

53. The optical fiber of claim 52, wherein the optical fiber segment spans from the first point to the pinning point.

54. An optical fiber minimizing pulse degradation resulting from random chromatic dispersion, the fiber comprising:

a plurality of optical fiber segments joined to form a first optical fiber, the first optical fiber having a predicted accumulated dispersion and an actual accumulated dispersion; and wherein the actual accumulated dispersion approximates the predicted accumulated dispersion at a pinning point within each optical fiber segment.

55. The optical fiber of claim 54, wherein the pinning point is located at an end of each optical fiber segment.

56. The optical fiber of claim 54, wherein a distance between each consecutive pinning point approximates a correlation scale, the correlation scale being an operational pulse width of a signal raised to the fourth power divided by a dispersion noise strength.

57. The optical fiber of claim 56, wherein the operational pulse width of the signal is a width of a shortest pulse expected to travel along the first optical fiber.

58. The optical fiber of claim 54, wherein a distance between each consecutive pinning point is less than a correlation scale, the correlation scale being an operational pulse width of a signal raised to the fourth power divided by a dispersion noise strength.

59. The optical fiber of claim 54, wherein a distance between each consecutive pinning point is distributed between approximately zero and approximately two times the correlation scale, the correlation scale being an operational pulse width of a signal raised to the fourth power divided by a dispersion noise strength.

60. The method of claim 54, wherein at least one of the plurality of optical fiber segments further comprises a compensating strand of optical fiber, the compensating strand configured to alter the actual accumulated chromatic dispersion such that the actual accumulated chromatic dispersion approximates the predicted accumulated chromatic dispersion at a pinning point within the compensating strand.

61. An optical fiber of claim 54, wherein at least one optical fiber segment is made by a method, the method comprising:

determining a predicted accumulated chromatic dispersion from a first point along a second optical fiber;

determining an actual accumulated chromatic dispersion from the first point along the second optical fiber;

locating a pinning point on the second optical fiber where the actual accumulated chromatic dispersion approximates the predicted accumulated chromatic dispersion; and forming an optical fiber segment having a pinning point therein.

62. The optical fiber of claim 54, wherein the first optical fiber is a single-mode fiber.

63. The optical fiber of claim 54, wherein the first optical fiber is wherein the optical fiber is selected from a group consisting of dispersion managed fiber, fiber having constant positive predicted dispersion, dispersion shifted fiber, dispersion flattened fiber, large effective area optical fiber (LEAF), and dispersion management fiber of second and third order dispersion.

64. The optical fiber of claim 54, wherein the first optical fiber is configured to transmit a signal using a soliton-based transmission method.

* * * * *